United States Patent
Khan et al.

[11] Patent Number: 5,804,920
[45] Date of Patent: Sep. 8, 1998

[54] PLASMA ADDRESSED LIQUID CRYSTAL DISPLAY WITH ETCHED GLASS SPACERS

[75] Inventors: Babar A. Khan, Ossining, N.Y.; Henri R. J. R. Van Helleputte; Adrianus L. J. Burgmans, both of Eindhoven, Netherlands; Karel Elbert Kuijk, Dommelen, Netherlands; Petrus F. G. Bongaerts, Waalre, Netherlands; Jacob Bruinink, Eindhoven, Netherlands

[73] Assignee: Philips Electronics North America Corporation, New York, N.Y.

[21] Appl. No.: 588,799

[22] Filed: Jan. 19, 1996

[51] Int. Cl.⁶ ....................................................... H01J 17/49
[52] U.S. Cl. .......................... 313/582; 313/584; 313/585; 345/60
[58] Field of Search ..................... 313/582, 584, 313/585, 495, 586, 583, 505, 630, 631, 633; 345/87, 60, 62; 315/169.4

[56] References Cited

U.S. PATENT DOCUMENTS

| | | | |
|---|---|---|---|
| 4,896,149 | 1/1990 | Buzak et al. | 340/794 |
| 5,077,553 | 12/1991 | Buzak | 340/794 |
| 5,272,472 | 12/1993 | Buzak | 345/60 |
| 5,276,384 | 1/1994 | Martin | 313/582 |
| 5,395,481 | 3/1995 | McCarthy | 156/630 |
| 5,440,201 | 8/1995 | Martin et al. | 313/582 |
| 5,453,660 | 9/1995 | Martin et al. | 313/582 |
| 5,525,862 | 6/1996 | Miyazaki | 313/586 |
| 5,619,097 | 4/1997 | Jones | 313/495 |

OTHER PUBLICATIONS

Buzak et al, "A 16–Inch Full Color Plasma Addressed Liquid Crystal Display", Digest of Tech. Papers, 1993 SID Int. Symp., Soc. for Info. Displ. pp. 883–886.

*Primary Examiner*—Sandra L. O'Shea
*Assistant Examiner*—Mack Haynes
*Attorney, Agent, or Firm*—John C. Fox

[57] ABSTRACT

A flat display device, preferably of the PALC type, in which the plasma channels are formed by etching laterally-spaced slots in a spacer plate, attaching a thin dielectric sheet over the etched spacer plate, and bonding the etched spacer plate to a transparent substrate such that each channel is formed by the portion of the substrate between flanking walls formed by the etched slots in the spacer plate, adjacent flanking walls in the spacer plate, and the overlying portion of the thin dielectric sheet. By positioning the flanking walls between channel electrode pairs, thus providing glass-to-glass interfaces, anodic bonding can be employed to assemble the three channel elements. Etching can be simplified by pre-attaching the unetched channel plate to the substrate or thin dielectric cover sheet with an intervening etch stop, and etching in situ using the etch stop to prevent etching of the substrate or thin dielectric cover sheet. In a modification, the thin dielectric cover sheet as a separate element is substituted by depositing a continuous layer or multi-layers including an etch stop on the unetched spacer plate so that, following the etching, the deposited layer or multi-layer remains as the thin channel cover.

16 Claims, 4 Drawing Sheets

PLASMA ADDRESSED LIQUID CRYSTAL DISPLAY WITH ETCHED GLASS SPACERS

RELATED APPLICATIONS

1) Application Ser. No. 08/384,290, filed Feb. 6, 1995 (PHA 0,090).

2) U.S. Pat. No. 5,596,431, issued Jan. 21, 1997 (PHA 60,092).

3) Application Ser. No. 08/573,742, filed Dec. 18, 1995 (PHA 60,097).

4) Application Ser. No. 08/588,799, filed Jan. 19, 1996 (PHA 60,100).

BACKGROUND OF INVENTION

This invention relates to plasma channels, to display devices comprising plasma channels, and to plasma-addressed liquid crystal display panels commonly referred to as "PALC" display devices using such channels. PALC devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of the backlight or incident light to each LC pixel is a function of the stored voltage across the pixel. A more detailed description is unnecessary because the construction, fabrication, and operation of such PALC devices have been described in detail in the following U.S. patents and publication, the contents of which are hereby incorporated by reference: U.S. Pat. Nos. 4,896,149; 5,077,553; 5,272,472; 5,276,384; and Buzak et al., "A 16-Inch Full Color Plasma Addressed Liquid Crystal Display", Digest of Tech. Papers, 1993 SID Int. Symp., Soc. for Info. Displ. pp. 883–886.

A partial perspective view of the PALC display described in the 1993 SID Digest is shown in FIG. 2. The method described in the referenced publication for making the plasma channels is to chemically etch a flat glass substrate to form parallel semi-cylindrically shaped recesses defined by spaced ridges or mesas and to bond on top of the mesas a thin dielectric cover sheet having a thickness in the range of about 30–50 $\mu$m.

The above construction and its fabrication encounters certain problems. Since the channel electrodes must be patterned on the sloping sidewall of the channel, the dimensions and placement of the electrodes cannot be accurately controlled. Moreover, since slight variations in processing conditions can alter the etch rate, the channel etching process is difficult to control; hence the depth of the channel, which is dependent on control of the etching process, is difficult to control.

European Patent 0 500 084 A2 describes the formation of channels by patterning of electrodes on a flat substrate, providing spacers on the flat substrate, and placing the thin glass sheet on top of the spacers. The discharge space thus extends continuously across the electrodes. However, the continuous discharge space will lead between channels to crosstalk which is difficult to avoid. Moreover, the spacers have to be formed on the flat substrate by deposition and/or etching processes, such as screen printing. Since the spacers have to be as thick as the required channel depth (~100 microns or more) the fabrication of the spacers adds complexity to the process.

European Patents 0 500 085 A2 and 0554 851 A1 describe the formation of channels by screen printing partition walls. However, this is also a difficult process, which may require multiple coats to obtain the required wall height.

SUMMARY OF INVENTION

An object of the invention is an improved channel plate.

A further object of the invention is an improved plasma-addressed display device.

Another object of the invention is an improved method for fabricating the plasma channels of a PALC display device.

In accordance with a first aspect of the invention, a channel plate comprises a dielectric substrate and a thin dielectric sheet-like member arranged over and spaced from the substrate by a plurality of laterally spaced, channel-defining spacer members each formed as part of a dielectric sheet patterned by through-holes, which latter sheet is herein referred to as the spacer sheet or plate. The holes are configured to form the desired channel configurations, typically elongated parallel channels, which preferably are straight but which also may be curved while still maintaining a substantially parallel relationship. The height of the spacer sheet above the substrate determines the height of the channels, which are each formed by the portion of the substrate surface extending between adjacent flanking spacers, the flanking spacers themselves forming the channel walls, and the overlying portion of the thin dielectric sheet-like member. Spaced electrodes are provided in each channel as well as a plasma-forming atmosphere. The channels are formed when the three sheet-like members—the substrate, the spacer plate, and the thin dielectric sheet—are assembled and bonded together. By locating the spacer walls between the electrodes, so that the walls contact directly the substrate surface or an ion-forming layer on the substrate, the three sheet-like members can be attached by anodic bonding, a well-known process using heat and an electric field to cause mobile ions in the contacting materials to migrate to the sheet interfaces and bond them together.

In accordance with a second aspect of the invention, an etch stop layer is provided on the facing surface of the substrate or on the facing surface of the thin dielectric sheet-like member, the spacer plate attached to the member containing the etch stop layer, and the etching conducted in situ using an etch mask on the exposed surface of the spacer plate, the etchant penetration into the sheet containing the etch stop automatically stopping when the etch stop layer is reached. This simplifies not only the etching step but also simplifies handling of these fragile sheet-like members.

In accordance with a third aspect of the invention, the thin dielectric sheet-like member, as a separate element, can be avoided by depositing on the surface of the spacer plate a continuous layer or layers comprising an etch stop material to a thickness sufficient for the deposited layer to span without breaking or other damage the through-holes etched in the spacer plate and to seal off the plasma-forming atmosphere subsequently introduced into the channels. The deposited layer or layers thereby forms the required thin dielectric cover sheet for the channels.

In accordance with a first preferred embodiment of the invention, the substrate is of glass, the thin dielectric sheet is of glass, and the spacer sheet is a glass plate, with the through-holes formed by chemical or plasma etching or by mechanical means such as sandblasting. The three glass members may be bonded together using fused glass frit as described in several of the cited patents and publications, or by anodic bonding as described in the first related patent application identified above.

In accordance with another preferred embodiment of the invention, the channel plate is part of a PALC display device, and the combination of the substrate, patterned spacer plate and the overlying thin dielectric sheet-like member, together with the electrodes, constitutes the plasma channels or channel plate of the PALC display device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
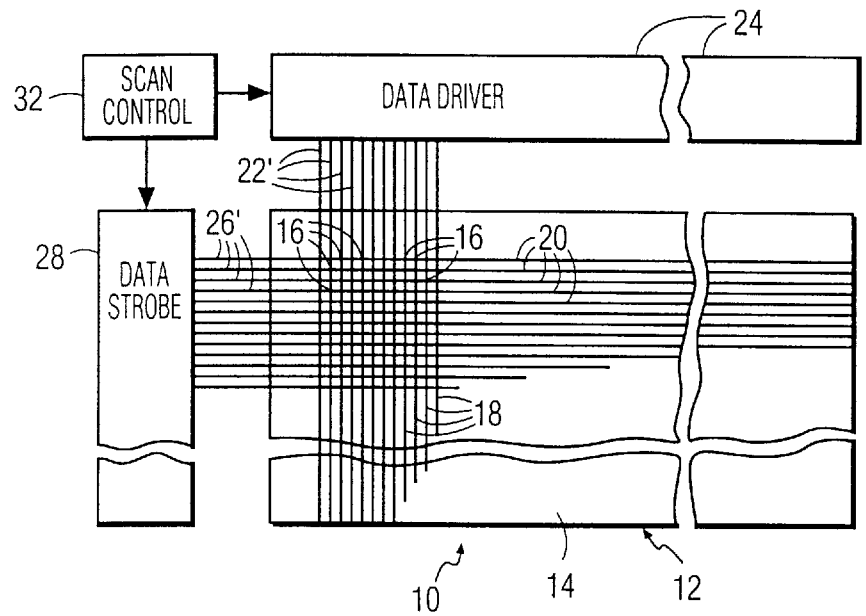
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
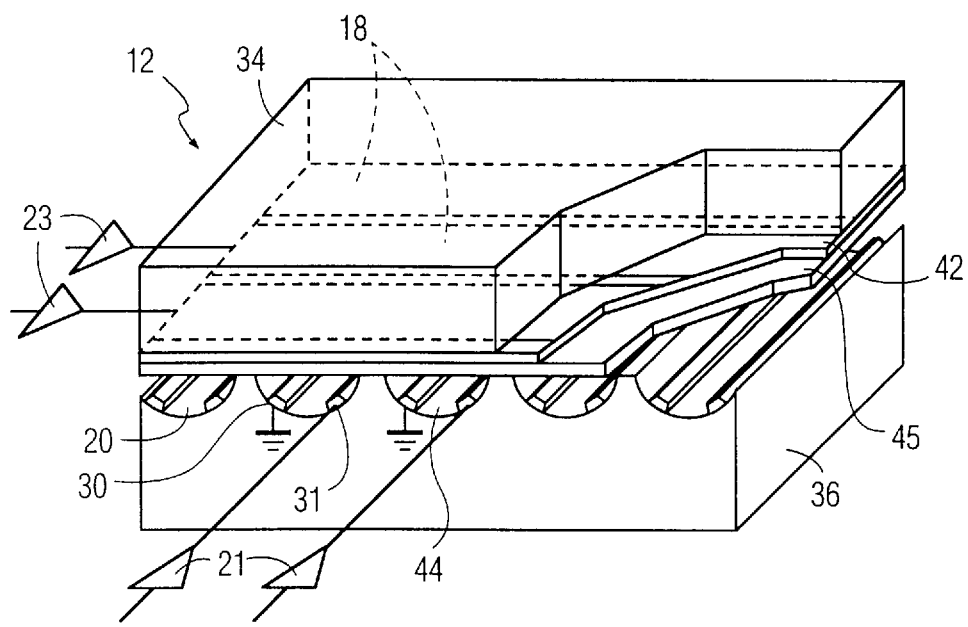
FIG. 2 is a perspective view of part of a conventional PALC display device.

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, typically only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is vapor-deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the cathode 31 and anode 30 electrodes. A thin dielectric glass microsheet 45 is then sealed across the peripheral edges of the device to form with the ridges 50 the channels 20, which are then exhausted, back-filled with a low-pressure ionizable gas such as helium and/or neon and optionally with a small percentage of other noble gases and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

Figure 3:
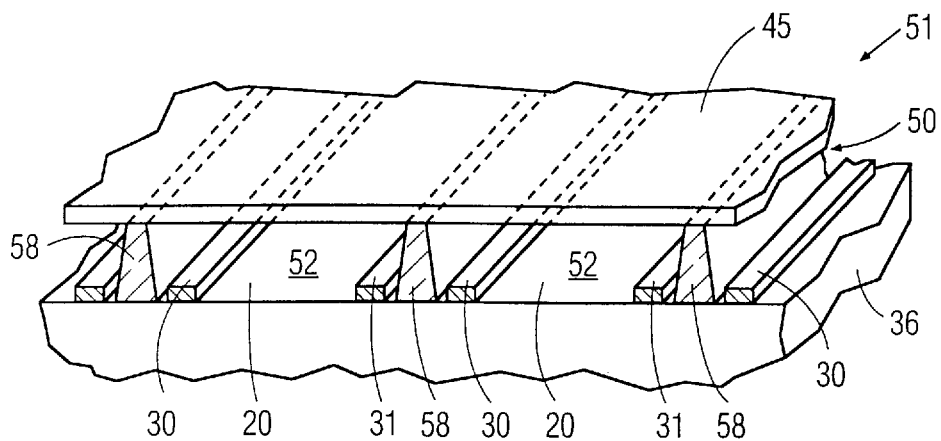
FIG. 3 is a perspective view of a part of one form of a channel plate according to the invention for use in a PALC color display.

FIG. 3 is a perspective view of part of one form of channel plate 51 in accordance with the invention for one form of liquid crystal display panel in accordance with the invention. A thick flat glass bottom plate 36 forms a substantially transparent dielectric substrate for the plasma channels 20. Over the bottom plate 36 is deposited spaced electrode layer portions 30, 31.

In accordance with the invention, the channels walls are formed in a transparent dielectric sheet 50 substantially equal in thickness to the required channel depth. The dielectric sheet 50 is preferably of an etchable material, such as glass. This is accomplished with glass by etching through-holes 52 in the glass using conventional masking and etching processes.

Figure 6:
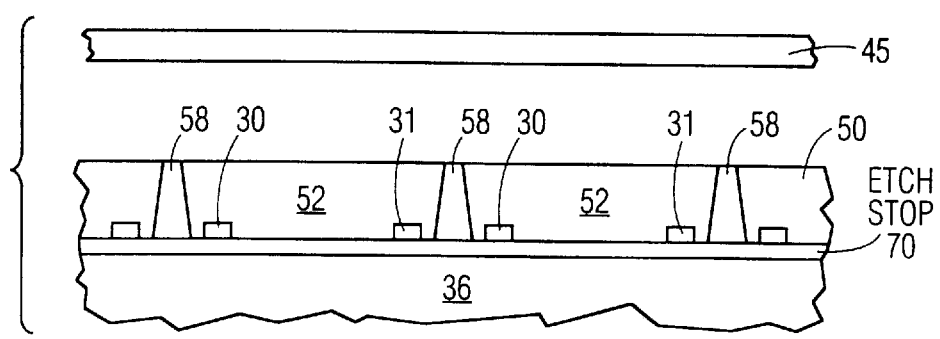
FIGS. 6 and 7 are exploded views illustrating two channel plate variants using etch stops in different ways in accordance with the invention.
Figure 7:
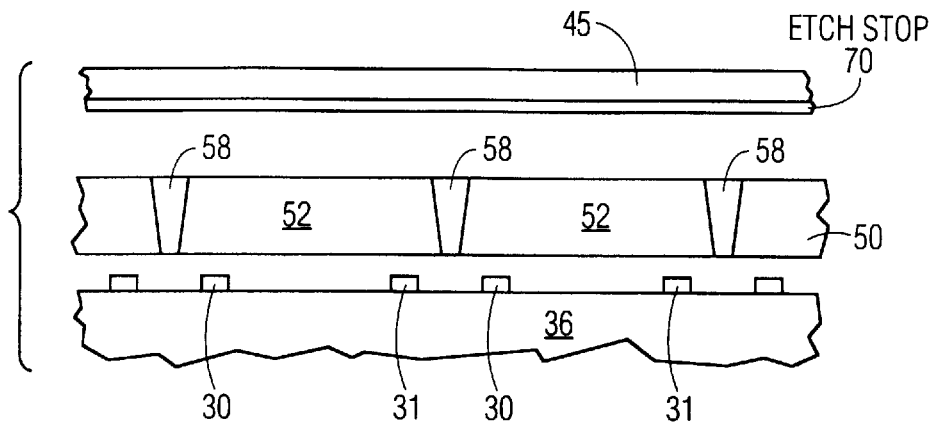

Two preferred ways for etching the glass to make the hole walls as close to the vertical as possible are described in FIGS. 6 and 7 of the fourth referenced related application, whose contents are incorporated herein. In brief, this can be done as one-sided etching with an etch mask on one surface of the spacer plate and with relatively small openings in the etch mask and etching holes whose lateral dimensions are at least five times larger than the mask opening and the depth of the hole, in this case the thickness of the sheet 50. Using an isotropic etchant during the etching process, as the etching progresses, the sidewalls become steeper. The larger the lateral dimensions of the etched hole relative to the thickness of the glass sheet 50, the steeper the sidewalls. As an example, not meant to be limiting, for a glass sheet 50 of about 100 $\mu$m thick, to etch holes that are 500 $\mu$m wide, the mask hole is preferably 100 $\mu$m wide. For a panel with straight channels as illustrated in FIG. 2, the holes 52 would be elongated slots extending nearly the full length of the plate 50, but would terminate at opposite sides in an annular glass border region 53 so that the plate 50 remains as an integral element except for the holes 52 in the form of parallel slots spaced apart by spacer walls 58.

Alternatively, the spacer walls can be made even more vertical by carrying out the etching from both sides of the plate 50. In this case, etch masks are required on both sides of the plate except where the holes are to be formed, and the mask holes overlie one another.

The thickness of the channel sidewalls 58 thus produced, it will be appreciated, represents the height of the channels 20 and constitute the spacers that space the thin dielectric sheet 45 that closes off the channels from the substrate 36, and thus the reference to the apertured plate 50 as the spacer plate. The etching can be by conventional chemical etchants or by conventional plasma etching. Alternatively, a mechanical erosion process can be substituted, such as sandblasting. This may be less costly and could also be used for materials for the spacer plate 50 that are more difficult to etch.

The channel electrodes 30, 31 are separately deposited and patterned on the substrate 36 as described in the referenced papers and patents, after which the thin glass sheet 45 is attached over the apertured spacer plate 50, and the latter then aligned and attached to the substrate 36 containing the electrodes. As shown, by proper positioning of the electrodes and the spacer plate walls 58 so as to lie between adjacent electrode pairs 31, 30, then the glass spacer walls 58 would directly contact the glass substrate 36 surface. Adjacent channels 20 would each contain its own electrode pair. Because the glass walls are directly in contact with the glass substrate surface, or ion-containing layers on the surfaces, all three sheets 36, 50, 45 can be anodically bonded to each other thereby avoiding the frit sealing process. It will also be appreciated that the electrodes 30, 31 can be deposited on the substrate 36 after the spacer plate 50 has been bonded to the substrate 36 instead of before as described above.

The walls 58 are shown with a slightly tapered shape, which would follow if the single-sided etching technique were used, as the glass surfaces closer to the mask hole would etch more than the more remote glass portions. If the double-sided etching process were used, then a double taper would result.

While the attaching of the thin dielectric sheet 45 to the spacer plate 50, and the attaching of the spacer plate 50 to the substrate 36 can also be carried out using fused glass frit at the periphery of the structure, anodic bonding preferably is used. Anodic bonding as such is a well known process for bonding two flat surfaces of ion-containing materials, such as glass. In a typical process, the glass sheets are placed against each other and an electric field applied across them while heating them to some intermediate elevated temperature which allows glass ions to become mobile. The ions migrate to the interface between the two sheets and pulls them together. The resultant force, in the presence of heat, leads to the formation of a permanent bond between the two sheets. Typical temperatures are much lower than the softening temperature of the glass.

Figure 5:
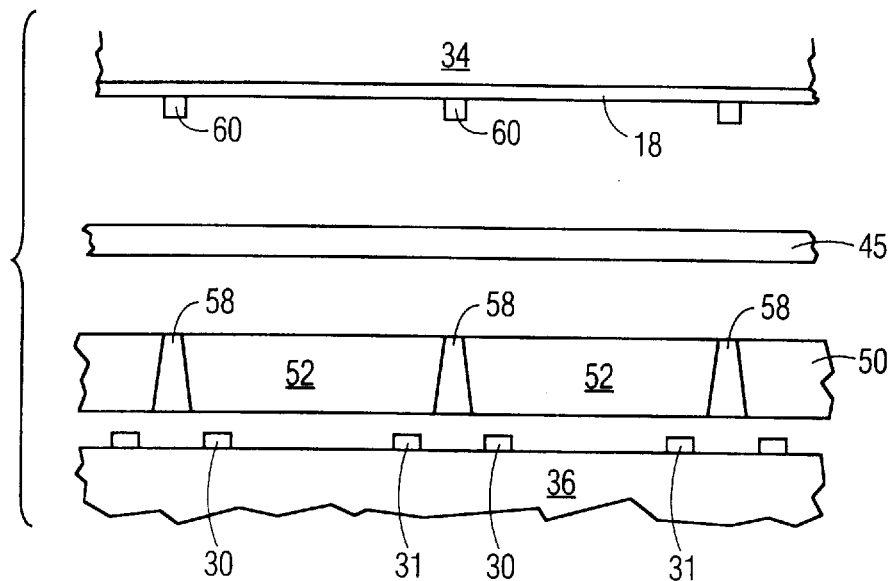
FIG. 5 is an exploded side view of the channel plate of FIG. 3.

The resultant assembled channel plate structure 51 is shown in FIG. 3. The remainder of the PALC panel can be fabricated in the usual way by filling and sealing the plasma panel and then forming the LC part of the panel on top of the thin glass sheet 45 as shown in FIG. 5 in an exploded view. The upper plate 34 may have deposited spacer members 60 which are aligned with the spacer walls 58 and act to space apart the upper structure 34 with its ITO electrodes 18 from the glass sheet 45 to provide a confined space for the LC material.

Two variants of the invention use an etch stop layer to control penetration of the etchant into any etchable material attached to the spacer plate while the etching process is carried out. In the variant illustrated in FIG. 6, an etch stop layer 70 is deposited on the substrate 36. The etch stop layer 70 may be any thin ion-containing dielectric layer that will etch much slower, preferably at least five times slower, than the material of the spacer plate 50. Suitable materials are, for example, silicon nitride, or a thin amorphous silicon layer, to a thickness of, for example, 1 μm. Both of these materials etch much slower in an hydroborofluoric etchant for the glass spacer plate 50. Next, the unetched spacer plate 50 can be attached as by anodic bonding to the deposited etch stop layer 70 which would be firmly bonded to the underlying substrate 36. The term "deposited" as used herein means a layer formed by a vapor-deposition process from a gas or vapor with or without an involved chemical reaction, or by a sputtering or evaporation process. Next, the spacer plate 50 can be etched as described above in situ, while attached to the substrate 36. The etching is more easily carried out since the etch stop layer 70 will prevent etching of the glass substrate 36 while the etching of the slots 58 continues laterally to form the desired steep vertical walls. Also, since the spacer plate 50 is much thinner than the substrate 36 and thus more fragile, its handling and processing while bonded to the more rigid and stronger substrate 36 is facilitated. In this case, the electrodes 30, 31 can be deposited and patterned after the spacer slots 52 are formed. The thin dielectric sheet 45 can then be attached by frit sealing or preferably by anodic bonding to form the assembled channel plate.

Figure 4:
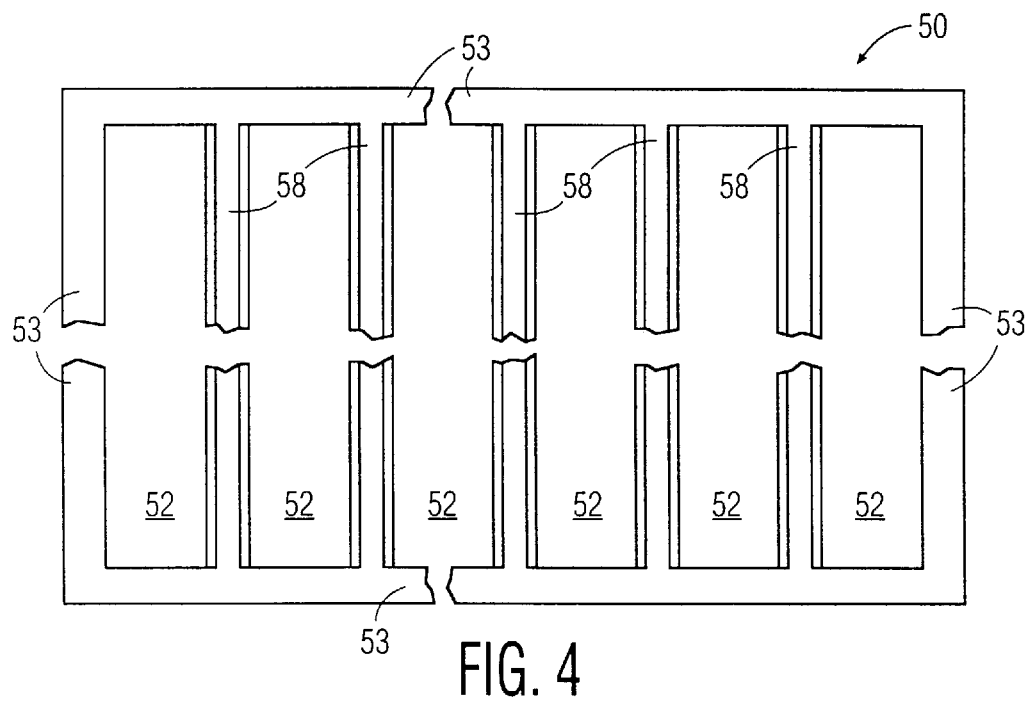
FIG. 4 is a top view of the spacer plate used in that channel plate.

In the further variant illustrated in FIG. 7, the etch stop layer 70 is deposited on the facing surface of the thin dielectric sheet 45. The unetched spacer plate 50 is then anodically bonded to the etch stop layer 70 as before, following which the spacer plate 50 is etched as also described before. The same benefits as are obtained with the variant described in connection with FIG. 6 are obtained here except that the dielectric sheet 45 is much thinner and thus less rigid than the substrate 36. In this case, however, the border region 53 (FIG. 4) can be made wider or thicker to strengthen the spacer plate when attached to the thin dielectric sheet 45.

In both variants, the etch stop layer 70 can instead be deposited on the unetched spacer plate which is then bonded to the substrate 36 or the thin dielectric sheet 45 as the case may be so that the etch stop layer is positioned between the substrate or thin dielectric sheet and the spacer plate.

As a further alternative, crossbars 62 can be added to the spacer plate as described in the fourth referenced related application to strengthen the etched spacer plate.

Figure 8:
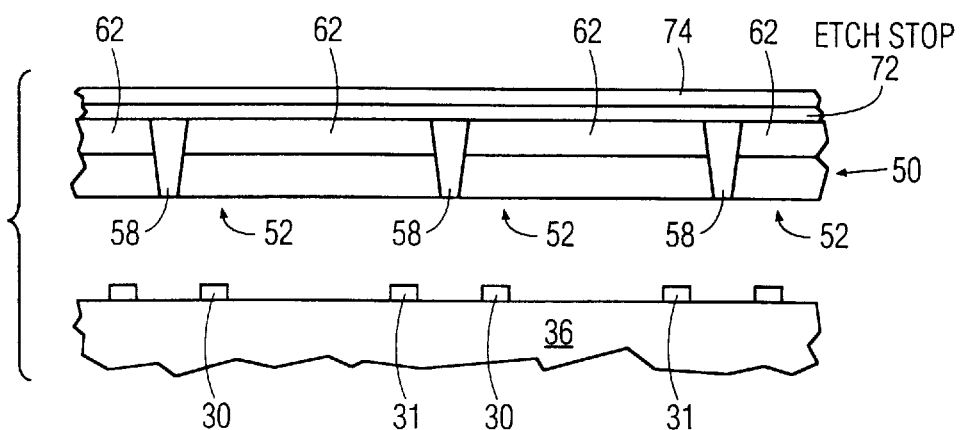
FIG. 8 is an exploded view of still further variants in accordance with the invention.

FIG. 8 illustrates still a further variant which enables omitting of the thin dielectric sheet 45 as a separate element. In this modification, a continuous etch stop dielectric layer 72 is deposited as shown on the outer surface of the unetched spacer plate 50. This etch stop layer can be made much thicker, for example, 50 μm thick, i.e., thick enough to be sufficiently self-supporting to span the subsequently etched slots 52 without breaking or being otherwise damaged. Alternatively, a thin etch stop layer 72 can be used as before but with additional continuous layers 74 deposited on top to increase its strength. As one example, the etch stop 72 can be, for example, of silicon nitride or amorphous silicon, with a thicker deposited dielectric top layer 74, for example, of spin-on glass or low-temperature deposited silicon dioxide. As before, the slots 52 are then etched in the spacer plate 50, the etch stop layer 72 serving to prevent etching of the materials of the single or multi-layer deposit 74 above. The completed etched spacer plate 50, with the continuous layers 72, 74 serving now as the thin dielectric sheet to seal off the tops of the channels 20, can be attached to the substrate 36. In this case, anodic bonding or glass frit bonding can be used. In this modification, a separate top sheet 45 is unnecessary.

In this last variant, it may be desirable to limit the etching of the slots 58 to the active region to be used as the display area of the completed device, so that the frit sealing for sealing the electrodes where they exit the discharge space does not come into contact with the thin deposited layers 72, 74 which seal off the top of the channels 20. Moreover, if anodic bonding is used, it may be desirable to etch the region of the substrate where the electrodes exit the discharge space so that the electrodes extend below the surface of the substrate as they exit the discharge space. With this arrangement, the glass frit seal in the region where the electrodes exit the discharge space will not come into contact with the deposited dielectric layers 72, 74, but only with relatively robust glass sheets.

The broken lines at the edges of the elements in the figures indicate that what is shown is a small section broken off from a larger assembly, since, as will be appreciated, typically a PALC display device for monitor use would contain several hundred column electrodes 18 and several hundred plasma channels 20.

It will be noted that the arrangement described in the fourth referenced related application, where the spacer wall portions 58 rest on the electrically conductive layers 30, 31, which thus remain exposed and able to perform their function of igniting an electrically conductive plasma when suitable voltages are applied between them, the adjacent channels thereby sharing a common electrode, can be used in the embodiment described in connection with FIG. 8 in place of separate electrode pairs for each channel.

The electrode materials are typically of a metal such as copper, or layers of Cu-Cr-Cu, or other suitable metals.

In a variation of the invention, where the width of the channels 20 may be large, or where the thin spacer plate 50 acts as the substrate for the deposited layers 72, 74, it may be desirable to increase the mechanical strength of the spacer plate 50. This can be done as illustrated in FIG. 8 by etching strengthening crossbars 62 in the spacer plate 50. The crossbars 62 which extend laterally to and between the spacer walls 58 are thus integral with the plate 60. To avoid the crossbars 62 from possibly detrimentally affecting the operation of the plasma discharge in the channels 20, their height can be reduced without reducing the height of the spacer walls 58. By appropriate masking and etching techniques, easily determined by those skilled in this art, the crosssbars can be made so that they do not extend all the way to the height of the channels 20.

All of the methods described in the referenced patents and publication will be suitable for making the remaining parts of the panel of the invention.

The invention is generally applicable to all kinds of flat displays, and in particular to displays of the plasma-addressed type, especially PALC displays that typically have a small channel pitch for use in computer monitors, workstations or TV applications. While the main application of the channel plate of the invention is in PALC type display devices, the same plasma plate construction 51 can also be used as a plasma display device where the output is the light, generated by the plasma, which can exit the device via the transparent substrate and/or the overlying transparent sheet-like member.

Several preferred examples for the FIG. 3 embodiment are (all values are in µm): a wall width of about 20–50; a wall height of about 50–160; and a wall pitch of about 200–500.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A channel plate for a flat display comprising a dielectric substrate having a substantially planar upper surface, an integral dielectric sheet directly contacting the upper surface of the substrate, and a thin dielectric sheet-like member on the top of the integral dielectric sheet, the integral dielectric sheet being substantially equal in thickness to the required channel depth and having elongated through-holes defining flanking wall portions, the flanking wall portions directly in contact with the upper surface of the substrate, whereby the upper surface of the substrate, the flanking wall portions and the thin dielectric sheet-like member together define elongated channels, and electrode surfaces in each of the channels.

2. A channel plate as claimed in claim 1, wherein the thin dielectric sheet-like member, the dielectric sheet, and the substrate are constituted of glass.

3. A channel plate as claimed in claim 1, wherein the flanking wall portions are joined at their periphery by an integral border region.

4. A channel plate as claimed in claim 1, wherein the flanking wall portions are laterally spaced apart by etched slots.

5. A channel plate for a flat display comprising a dielectric substrate having a substantially planar upper surface, an integral dielectric sheet directly contacting the upper surface of the substrate, and a thin dielectric sheet-like member on the top of the integral dielectric sheet, the integral dielectric sheet being substantially equal in thickness to the required channel depth and having elongated etched through-holes defining flanking wall portions, and an etch stop layer on the upper surface of the substrate, the flanking wall portions directly in contact with the etch stop layer, whereby the upper surface of the etch stop layer, the flanking wall portions and the thin dielectric sheet-like member together define elongated channels, and electrode surfaces in each of the channels.

6. A channel plate as claimed in claim 5, wherein the dielectric sheet and substrate are constituted of glass, and the etch stop is of silicon nitride or amorphous silicon.

7. A channel plate for a flat display comprising elongated channels on a dielectric substrate and electrode surfaces in each of the channels, said dielectric substrate comprising channel-defining flanking wall portions on the substrate with a thin dielectric sheet-like member attached to the flanking wall portions, characterized in that:

a) the flanking wall portions are parts of an integral dielectric sheet formed by etched spaced slots in the dielectric sheet, b) an etch stop layer is on the thin dielectric sheet-like member between the thin dielectric sheet like member and the flanking walls.

8. A channel plate as claimed in claim 7, wherein the thin dielectric sheet-like member and dielectric sheet are constituted of glass, and the etch stop is of silicon nitride or amorphous silicon.

9. A channel plate for a flat display comprising elongated channels on a dielectric substrate and electrode surfaces in each of the channels, said dielectric substrate comprising channel-defining flanking wall portions on the substrate with a thin dielectric sheet-like member over the flanking wall portions, characterized in that:

a) the flanking wall portions are parts of an integral dielectric sheet formed by etched spaced slots in the dielectric sheet, b) the thin dielectric sheet-like member comprises a continuous deposited layer on the surface of the dielectric sheet remote from the substrate and extending over the etched slots, c) the continuous deposited layer comprises an etch stop layer.

10. A channel plate as claimed in claim 9, wherein the dielectric sheet and substrate are constituted of glass, and the etch stop is of silicon nitride or amorphous silicon.

11. A channel plate as claimed in claim 9, wherein the continuous deposited layer comprises on the etch stop layer a thicker top layer.

12. A channel plate as claimed in claim 11, wherein the top layer comprises spin-on glass or low temperature deposited silicon dioxide.

13. A plasma channel plate for use in a PALC display device comprising elongated channels having electrodes and filled with a plasma-forming atmosphere on a substantially transparent dielectric substrate having an ion-containing surface, characterized in that:

a) on the substrate is a plurality of deposited spaced electrically conductive electrode layer portions, b) each of the channels is defined by flanking wall portions formed as part of an integral spacer plate mounted over the substrate and directly contacting the ion-containing surface and over the spacer plate a thin dielectric sheet.

14. A plasma channel plate for use in a PALC display device comprising elongated channels having electrodes and filled with a plasma-forming atmosphere on a substantially transparent dielectric substrate and covered by a thin dielectric sheet, characterized in that:

a) on the substrate is a plurality of deposited spaced electrically conductive electrode layer portions, b) each of the channels is defined by flanking wall portions formed as part of an integral spacer plate by spaced etched slots and attached to the substrate, c) an etch stop layer is on the substrate or thin dielectric sheet between the substrate or thin dielectric sheet and the flanking wall portions.

15. A plasma channel plate as claimed in claim 14, wherein the substrate, the spacer plate, and the thin dielectric sheet are each constituted by a glass sheet-like member.

16. A plasma channel plate as claimed in claim 15, wherein the thin dielectric sheet is a layer or layers comprising the etch stop layer deposited on the spacer plate.

* * * * *